United States Patent [19]

Cohen et al.

[11] Patent Number: 5,825,771
[45] Date of Patent: Oct. 20, 1998

[54] AUDIO TRANSCEIVER

[75] Inventors: Alon Cohen, Rishon LeZion; Lior Haramaty, Ramat Gan, both of Israel

[73] Assignee: VocalTec Ltd., Herzlia, Israel

[21] Appl. No.: 337,616

[22] Filed: Nov. 10, 1994

[51] Int. Cl.$^6$ .................................................. H04J 3/24
[52] U.S. Cl. .......................... 370/394; 370/270; 370/384; 370/493; 370/522; 379/80
[58] Field of Search ........................ 370/94.1, 60, 110.1, 370/79, 62, 58.2, 85.1, 394, 389, 265, 270, 422, 522, 465, 437, 494, 495, 496, 468, 411, 493, 452; 379/80, 88, 280; 375/27

[56] References Cited

U.S. PATENT DOCUMENTS

| | | | |
|---|---|---|---|
| 4,581,735 | 4/1986 | Flamm et al. ............................. | 370/85 |
| 4,589,107 | 5/1986 | Middleton et al. ....................... | 370/62 |
| 4,630,262 | 12/1986 | Callens et al. ............................ | 370/81 |
| 4,679,190 | 7/1987 | Dias et al. ............................... | 370/160 |
| 4,698,803 | 10/1987 | Haselton et al. ......................... | 370/60 |
| 4,716,585 | 12/1987 | Tompkins et al. ....................... | 379/202 |
| 4,782,515 | 11/1988 | Philips .................................... | 379/172 |
| 4,792,945 | 12/1988 | Mark ....................................... | 370/85 |
| 4,819,228 | 4/1989 | Baran et al. ............................. | 370/85 |
| 4,866,704 | 9/1989 | Bergman ................................. | 370/452 |
| 4,882,754 | 11/1989 | Weaver ................................... | 381/35 |
| 4,893,326 | 1/1990 | Duran et al. ............................ | 379/53 |
| 4,903,261 | 2/1990 | Baran et al. ............................. | 370/94.2 |
| 4,991,172 | 2/1991 | Cidon et al. ............................. | 370/94.1 |
| 5,018,136 | 5/1991 | Gollub .................................... | 370/60.1 |
| 5,042,028 | 8/1991 | Ogawa .................................... | 370/58.2 |
| 5,127,001 | 6/1992 | Stegall et al. ............................ | 370/62 |
| 5,155,760 | 10/1992 | Johnson .................................. | 379/67 |
| 5,170,427 | 12/1992 | Guichard et al. ........................ | 379/53 |
| 5,274,642 | 12/1993 | Widjaja et al. .......................... | 370/411 |
| 5,294,139 | 3/1994 | Okura ..................................... | 370/60 |
| 5,297,139 | 3/1994 | Okura et al. ............................ | 370/79 |
| 5,323,272 | 6/1994 | Klinger ................................... | 360/8 |
| 5,327,461 | 7/1994 | Kushige .................................. | 375/27 |
| 5,383,181 | 1/1995 | Aramaki ................................. | 370/60 |
| 5,434,797 | 7/1995 | Barris ..................................... | 364/514 A |

FOREIGN PATENT DOCUMENTS

| | | | |
|---|---|---|---|
| A 3-286033 | 9/1993 | Japan ............................. | H04L 12/56 |
| A 3-315845 | 12/1993 | Japan ............................. | H04L 12/56 |

OTHER PUBLICATIONS

W. A. Montgomery, "Techniques for Packet Voice Synchronization", IEEE Journal on Selected Areas of Communications, vol. SAC–1, No. 6, Dec. 1983.

C. J. Weinstein, "Exoerience With Speech Communication in Packet Networks", IEEE Journal on Selected Areas of Communications, Vol. SAC–1, No. 6, Dec. 1983.

Cosmos Nicolaou, "An Architecture for Real–Time Multimedia Communication Systems", IEEE Journal on Selected Areas of Communications, vol. 8., No. 3, Apr. 1990.

Wong et al., "An Integrated Services Token–Controlled Ring Network", IEEE Journal on Selected Areas of Communications, vol. 7, No. 5, Jun. 1989.

Friedman et al., "Packet Voice Communication Over PC–Based Local Area Networks", IEEE Journal on Selected Areas of Communications, vol. 7, No. 2, Feb. 1989.

(List continued on next page.)

*Primary Examiner*—Douglas W. Olms
*Assistant Examiner*—Shick Hom
*Attorney, Agent, or Firm*—Skjerven, Morrill, MacPherson, Franklin & Friel LLP

[57] ABSTRACT

The present invention is an audio transceiver (having an audio receiver and a transmitter) which, on the receiving side, adaptively controls the amount of audio data in the buffer of a PC audio device, such that the audio device always has something to play. On the transmission side, the audio transmitter provides at least sequence numbers to the audio packets to be sent. The audio receiver is concerned only with the state of the buffer of the audio device. Therefore, the audio transmitter does not have to be synchronized with the audio receiver.

30 Claims, 4 Drawing Sheets

OTHER PUBLICATIONS

Johnson et al., "A Local Access Network for Packetized Digital Voice Communications", IEEE Journal on Transactions on Communications, vol. COM–29, No. 5, May 1981.

Schooler et al., "A Packet–switched Multimedia Conferencing System", ACM SIGOIS Bulletin, vol. 1, No. 1, pp. 12–22, Jan. 1989.

Annett DeSchon, "Voice Terminal (VT) Program", USC Information Sciences Institute, Jan. 28, 1991.

Bolt Beranek and Newman Inc., "Voice Terminal (VT)", USC Information Sciences Instistute, May, 1991.

Casner et al., "N–Way Conferencing with Packet Video", The Third International Workshop on Packet Video, New Jersey, 22–23 Mar. 1990.

AUDIO TRANSCEIVER

FIELD OF THE INVENTION

The present invention relates to apparatus for providing real-time or near real-time communication of audio signals via a data network.

BACKGROUND OF THE INVENTION

Data networks transfer data, typically in the form of packets which usually have a fixed number of bytes of data, from one workstation to another. There are many types of network protocols by which networks setup communication paths. Ethernet and Token Ring are examples of low level network structures for packet data networks.

Regardless of the type of structure used, no network instantaneously provides packets from a source workstation to a destination one. There is a transmission delay which typically varies depending on the load on the network (i.e. how many workstations are trying to send at once) and/or on the configuration of the network (i.e. which path the packet takes) and type of protocol used.

If two, sequential packets take two different paths through the network, it is possible that they will arrive at the destination workstation after different amounts of time traveling through the network. They also might possibly arrive in the wrong order. Since most data transmitted over a network is transmitted for storage purposes, the delays and mixed up order are not critical, although it is always desirable to reduce them to a minimum.

Audio devices, which convert analog audio signals to digital ones, are known. These devices sample the analog audio signal, at some sampling frequency, to produce a digital datastream and then compress the datastream to reduce the storage or bandwidth requirements for storing or transmitting the datastream. The datastream can then be divided into packets and transmitted along a network, to be reassembled and played by the destination workstation. The playing involves converting the packets into the datastream which is then converted back into an analog signal. As is known in the art, digital to analog conversion also involves a converting frequency which is typically the same frequency as the sampling frequency of the audio device.

If the audio signal is to be stored by the destination workstation, then the delays and changed sequence are not critical. When the audio signal is retrieved from storage and played, it will be played smoothly since all of its packets are present in the storage medium.

However, if a real-time conversation is desired, an "audio packet" should be played by the audio device as soon as it arrives. This is difficult when working over a network for exactly the reasons described hereinabove; the packet order is not necessarily maintained during transmission and there is a network delay which is not of a fixed value. Furthermore, even if the delays are overcome, if the audio device of the source workstation has a sampling frequency which is different (faster or slower) than the converting frequency of the audio device of the destination workstation, the two cards will not be synchronized. If the source workstation samples at a higher frequency, the destination workstation will not be able to play the packets fast enough. Conversely, if the source workstation samples at a lower frequency, the destination workstation will not have enough packets to play.

The following two articles discuss the issues involved in providing audio communication over a packet data network:

Clifford J. Weinstein and James W. Forgie, "Experience with Speech Communication in Packet Networks", *IEEE Journal on Selected Areas in Communications*, Vol. SAC-1, No. 6, December 1983, pp. 963–980; and Warren A. Montgomery, "Techniques for Packet Voice Synchronization", *IEEE Journal on Selected Areas in Communications*, Vol. SAC-1, No. 6, December 1983, pp. 1022–1028.

The first article discusses network protocols for transmitting speech. The second article discusses a packet voice receiver unit which chooses a target playout time for each packet. The playout time is a fixed interval after its production by the source workstation. The packet is played only if it arrives before its target playout time. The second article also discusses a number of methods for determining the delay encountered by a packet due to the network. Since the second article assumes that the two audio devices are almost synchronized (i.e. their frequencies are very close) and that speechbursts are short, it increases the target playout time to compensate for the lack of synchronization.

The second article also discusses adaptively changing the target playout time, typically during silent periods. It can also change the target playout time during playout, although the article mentions that changing the playout time during playout requires maintaining the pitch of the speech. Finally, the second article discusses the impact of synchronization techniques on network design.

Programs for enabling audio communication over networks of similar types of workstations are known. For example, the programs NetFone and Vtalk are designed to send voice signals over a data network; however, these programs work only between workstations manufactured by Sun Microsystems, Inc. of USA.

A voice communication system over a network running the Ethernet protocol is commercially available from Genisys Comm Inc. of Rome, N.Y., USA. This system works with personal computers (PCs).

SUMMARY OF THE PRESENT INVENTION

It is an object of the present invention to provide an audio transceiver between a personal computer (PC) and a packet data network.

The present invention is an audio transceiver (having an audio receiver and a transmitter) which, on the receiving side, adaptively controls the amount of audio data in the buffer of a PC audio device, such that the audio device always has something to play. On the transmission side, the audio transmitter provides at least sequence numbers to the audio packets to be sent. The audio receiver receives the audio packets, processes them and plays them as soon as possible thereafter.

Since the present invention does not measure the amount of time it took for the audio packets to come, the audio receiver and transmitter can be placed at the ends of any size network (one with a short delay or one with a long delay).

In addition, the audio receiver is concerned only with the state of the buffer of the audio device. Therefore, the audio transmitter does not have to be synchronized with the audio receiver. Their clocks can be slightly or significantly different; the audio receiver can handle both situations.

Specifically, in accordance with a preferred embodiment of the present invention, the audio transceiver includes, apparatus for sequence-stamping outgoing audio packets received from the audio device and, on input, apparatus for receiving a stream of the sequence-stamped audio packets from the packet data network, fullness setting apparatus and fullness adjusting apparatus. The fullness setting apparatus transfers a silence buffer to a playback buffer of the audio device whenever the playback buffer is empty. The fullness adjusting apparatus adaptively controls the fullness of the playback buffer to generally match the playout rate of the audio device with the rate at which the audio packets are received.

In addition, in accordance with a preferred embodiment of the present invention, the transceiver includes apparatus for sequence- and destination-stamping all of the audio packets and apparatus for transmitting the audio packets via the network.

Moreover, in accordance with a preferred embodiment of the present invention, the transceiver includes sound detection apparatus which receives audio packets from the first audio device, which determines when the audio packets begin to contain sound and which sends the audio packets from the beginning of the sound.

Still further, in accordance with a preferred embodiment of the present invention, the packet data network is a private or, alternatively, a public network.

Additionally, in accordance with a preferred embodiment of the present invention, the fullness setting apparatus includes apparatus for increasing an adjustable fullness level. The adjusting apparatus includes apparatus for decreasing the adjustable fullness level and apparatus for processing audio data within the audio packets in order to fill the playback buffer to the current value of the fullness level.

Moreover, in accordance with a preferred embodiment of the present invention, the apparatus for processing includes apparatus for determining the amount of data in the playback buffer during a predetermined window of time. The apparatus for processing typically includes apparatus for adding and removing portions of the audio data as a function whether or not the current amount of data is less or more than the current value of the fullness level.

Further, in accordance with a preferred embodiment of the present invention, the apparatus for adding and removing includes apparatus for maintaining the size of the portions of audio data until the current amount of data reaches the current value of the fullness level.

Finally, the present invention includes a method for processing audio data which includes the actions performed by the elements described hereinabove.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
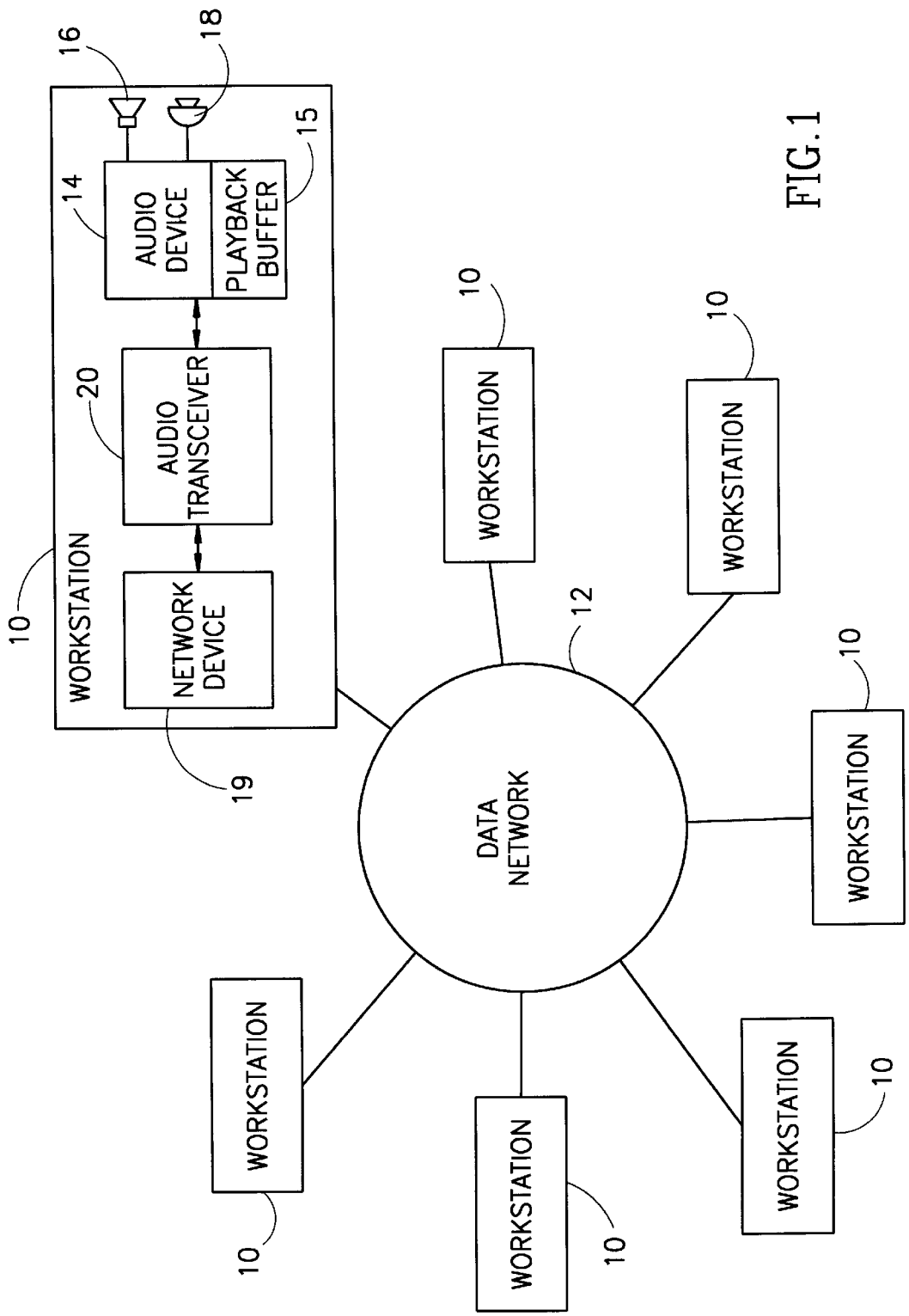
FIG. 1 is a schematic illustration of a plurality of workstations connected together via a network, wherein each workstation has an audio transceiver constructed and operative in accordance with a preferred embodiment of the present invention.
Figure 2:
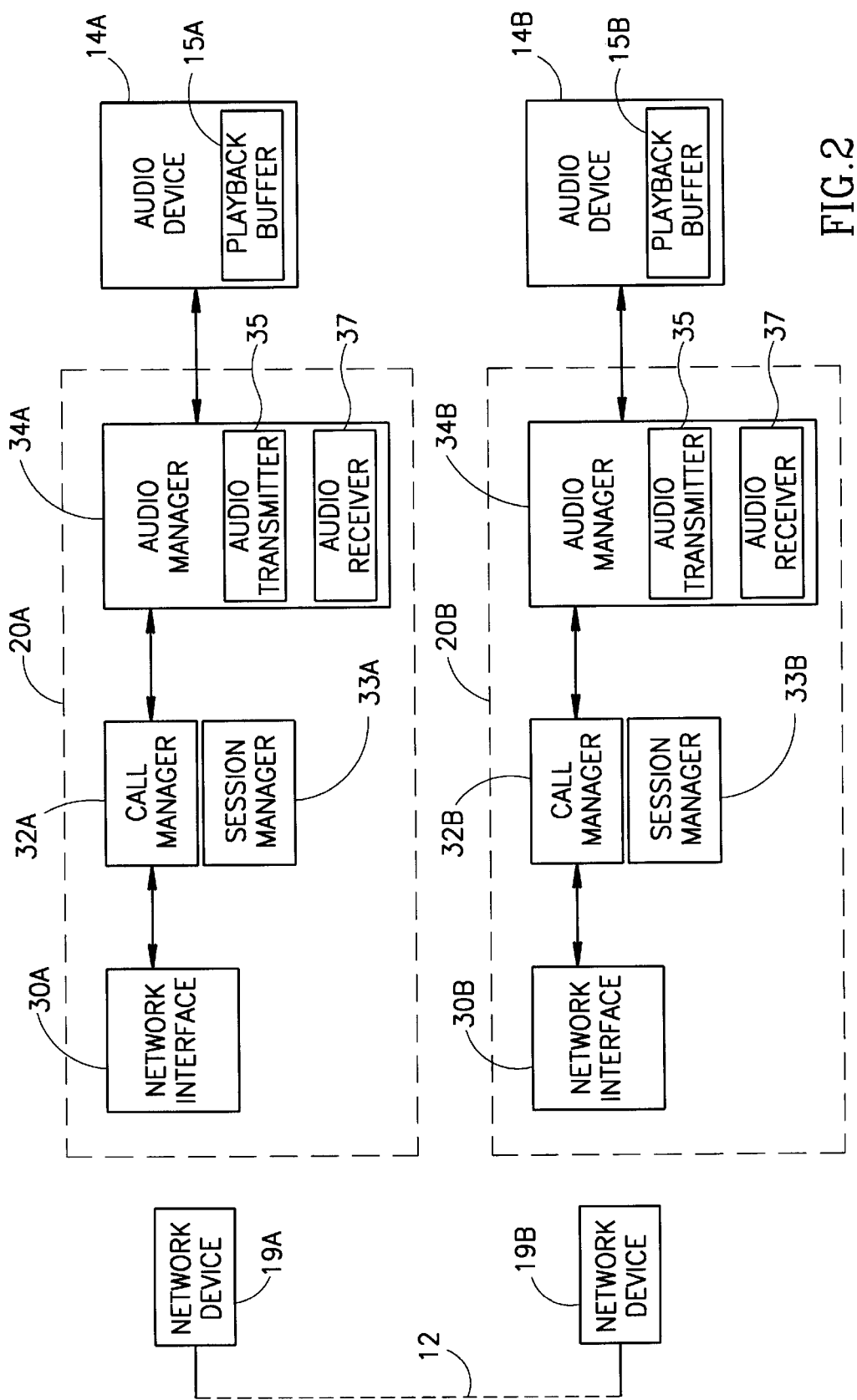
FIG. 2 is a block diagram illustration of the elements of the audio transceiver shown in FIG. 1.

Reference is now made to FIG. 1 which illustrates a network having audio communication via a plurality of audio transceivers, constructed and operative in accordance with a preferred embodiment of the present invention, and to FIG. 2 which illustrates, in general block diagram format, the elements of one audio transceiver of the present invention.

FIG. 1 illustrates a plurality of workstations 10 connected together via a packet data network 12. The data network 12 can be any type of network, such as a local area network (LAN) or a wide area network (WAN), and it can run any desired network protocol, such as SPX/IPX, TCP/IP, etc. Each workstation 10 is formed of a personal computer (PC) having an audio device 14 and a network device 19. The network device 19 connects its workstation 10 to the network 12. The audio device 14 is connected to a speaker 16 and a microphone 18 and is operative to play digitally recorded sound on the speaker 16 and to convert sound from the microphone 18 to a digital signal. Typical audio devices 14 have playback buffers 15.

The audio transceivers 20 of the present invention bridge between the audio devices 14 and the network devices 19 so that two workstations 10 can provide sound to each other in real- or near real-time, thus enabling the users at the two workstations 10 to have a reasonable voice conversation with each other.

As will be described in more detail hereinbelow, the audio transceiver 20 has an audio receiver and an audio transmitter. On the transmission side, the audio transmitter converts the audio datastream to packets and provides at least sequence numbers to the packets. On the receiving side, the audio receiver receives the audio packets and, in accordance with a preferred embodiment of the present invention, adaptively controls the amount of audio data in the playback buffer 15 of the audio device 14 to maintain a desired fullness level.

FIG. 2 illustrates the general structure of two audio transceivers 20, a source transceiver 20a and a destination transceiver 20b. The explanation of the general operation of the audio transceiver 20 will be provided herein in the context of a conversation between transceivers 20a and 20b.

Each transceiver comprises a network interface 30, a call manager 32, an audio manager 34, and a session manager 33, where the elements of the source transceiver 20a are labeled with an 'a' suffix and those of the destination transceiver are labeled with a 'b' suffix. The network interfaces 30 divide the audio datastream into packets and, via the network device 19, the network interfaces 30 connect to the network 12. The network interfaces 30 know the addresses of the workstations on the network and serve to connect their audio transceivers 20 to the desired destination workstation.

Through the source call manager 32a, the operator indicates with whom he wants to talk. The source call manager 32a converts the name of the person to the address of the workstation at which the person works and prepares a "call initiation" message (a data message) to that destination workstation. The source network interface 30a sends the call initiation message. The destination network interface 30b receives the call initiation message and provides it to its call manager 32b which, in turn, indicates to its operator that a call is being initiated. This indication can be via the display of the destination PC or by making a "call initiation" sound, such as that of a bell, on the destination audio device.

Typically, the destination call manager 32b also indicates to the operator who initiated the call.

The operator, if he wishes to talk to the person who initiated the call, makes an appropriate indication to the destination call manager 32b. In response, the destination call manager 32b sends an "OK to talk" message, through its network interface 30b, to the source audio transceiver 20a. The "OK to talk" message also indicates to the destination network interface 30b that further messages (which will contain audio data) are to be sent to its audio manager 34b.

The source network interface 30a, upon receipt of the "OK to talk" message, sends it to the source call manager 32a which, in turn, may provide an appropriate indication to its operator. The indication can be any desired type of indication, such as a sound like a telephone being picked up or some phrase, such as "OK to talk" or "Open", which indicates that the call has been successfully initiated. The "OK to talk" message also indicates to the source network interface 30a that any further messages are to be communicated to and from the audio manager 34a.

The call managers 32a and 32b periodically send call control signals indicating that their audio transceiver is currently active. The managers 32a and 32b monitor the flow of these control signals and also provide "end of conversation" indications. These can come as commands from the respective operators or after a predetermined length of time during which no control signal was received from the destination transceiver 20b.

The session managers 33 provide overall control to the elements of each audio transceiver 20. In particular, they manage the logical level of the session with the remote party.

The audio managers 34a and 34b process the digital audio data received from their respective network interfaces 30 and from their respective audio devices 14. The audio managers 34 are divided into audio transmitters 35 (detailed in FIG. 3) and audio receivers (detailed in FIGS. 4 and 5).

During a conversation, the transmitting audio manager 34a receives the audio datastream from its corresponding audio device 14 and processes the datastream to remove any silent parts. The resultant datastream is provided to the network interface 30a which divides the datastream into packets and adds network information, such as source and destination workstation addresses, to each packet. The packets are then sent to the network 12.

The receiving network interface 30b receives the packets and strips them of the network information, producing thereby an audio datastream. The receiving audio manager 34b processes the datastream in order to ensure that the playback buffers, labeled 15a and 15b, of their respective audio devices 14 have enough digital audio data to play, irrespective of a) the rate at which the packets arrive, b) the sampling rate of the source audio device 14a or c) the time at which the packets were originally produced.

If desired, the audio manager 34a can compress the audio datastream prior to sending it to the network interface 30a to form into packets. The compression (and decompression on the reception side) can be implemented using any suitable audio compression/decompression technique, such as the Adaptive Delay Pulse Code Modulation (ADPCM) technique described in the CCITT G.721 standard.

Figure 3:
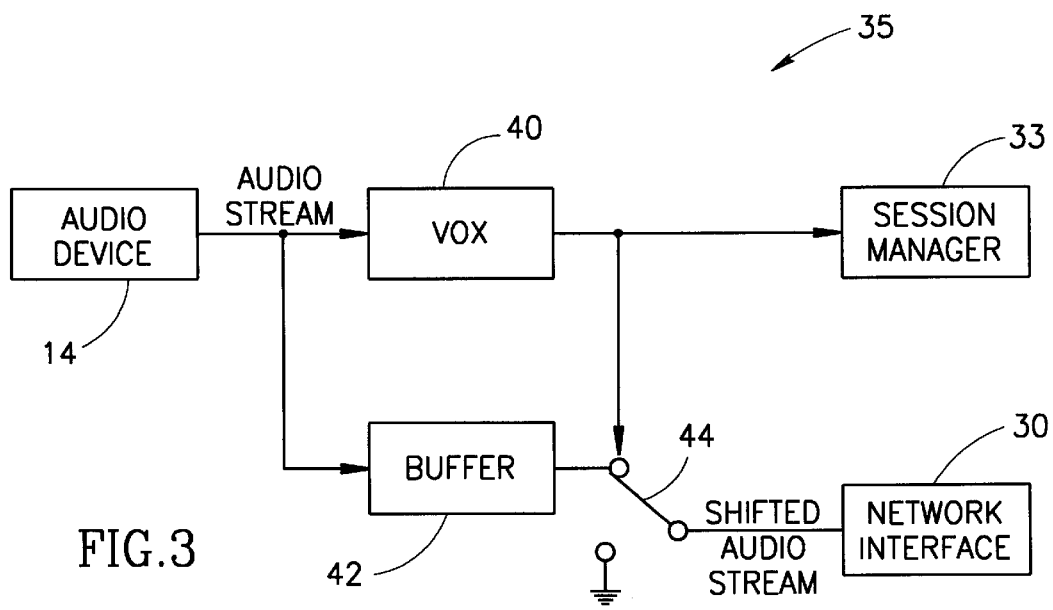
FIG. 3 is a schematic illustration of the transmitter portion of the transceiver of FIG. 2 in conjunction with the audio device.

FIG. 3, to which reference is now made, illustrates the elements and operation of the audio transmitter 35 of one audio manager 34. The audio transmitter 35 comprises a generally lossless sound detector, formed of a voice operated transmitter (VOX) 40, a buffer 42 and switch means 44. The sound detector removes any silent periods and enables the users to speak without having to indicate when he is finished speaking (i.e. so that the other person can begin speaking).

It is noted that people do not talk continuously but rather talk in bursts, known as "speechbursts". The sound detector determines when the audio datastream includes a speechbursts (as opposed to background noise) and shifts the datastream to account for the processing time of the VOX 40. Thus, the datastream which the VOX 40 processes is also stored in the buffer 42 whose length is generally related to the processing time of the VOX 40. Once the VOX 40 detects a significant sound within the datastream (which typically occurs near but not at the beginning of a speechbursts), it indicates to the switch means 44 to output the data stored in the buffer 42. If no sound was detected, the data stored in buffer 42 are overwritten.

In particular, the VOX 40 considers sound to be present as soon as some data within the buffer 42 is above a typically, but not necessarily, user-adjustable, sound threshold level. The entire contents of the buffer 42 (the datapoint above the sound threshold level plus all of the data before it), are output to the network interface 30 for division into packets.

When the buffer has had no datapoints above a silence threshold level, which is typically lower than the sound threshold level, for a few milliseconds (i.e. the speechbursts or conversation has ended), the VOX 40 indicates to the switch means 44 that to disconnect the buffer 42 from the network interface 30.

Figure 4:
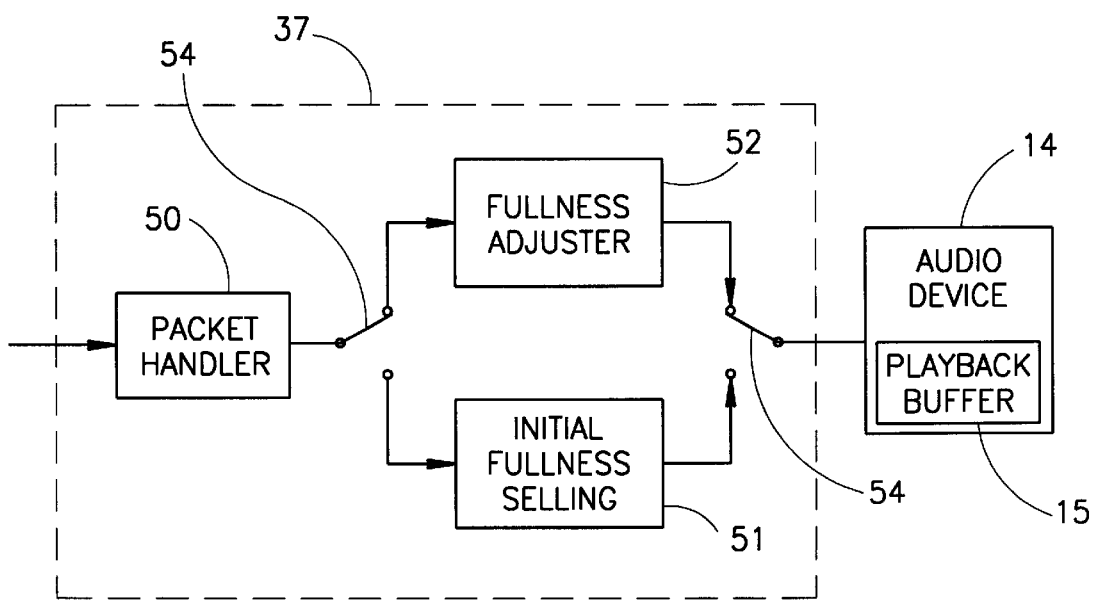
FIG. 4 is a block diagram illustration of receiver elements of the audio transceiver responsible for reassembling the audio packets received from the network such that they can be played in real-time.

Reference is now made to FIG. 4 which illustrates the elements of the audio receiver 37 of one audio manager 34. Audio receiver 37 comprises a packet handler 50, an initial fullness setting unit 51, a fullness adjuster 52, and switching means (noted by switches 54) for switching between the units 51 and 52. The output of audio receiver 37 is provided to the playback buffer 15 of the audio device 14.

It is noted that, since people speak in speechbursts, once a speechbursts has ended, the playback buffer 15 will have nothing left to play. Thus, the fullness setting unit 51 is activated at the beginning of each speechbursts.

It is also noted that the playback buffer 15 is a first-in, first-out (FIFO) buffer which, when requested by the audio device 14, provides the audio device with the oldest audio data stored therein. There is a minimum level of fullness, which varies with the type of audio device 14 utilized, below which the playback buffer 15 should not go, except if the speechbursts has ended.

The packet handler 50 receives the audio datastream and the sequence number of each packet from the corresponding network interface 30 and notes the sequence number of the packet. It is noted that each packet stores a plurality of "frames" of audio data and that each frame of audio data can be of any length and can include compressed or uncompressed data in it.

The packet handler 50 resamples the audio data to match the converting frequency of its corresponding audio device 14, as described in more detail hereinbelow. Packet handler 50 also compensates for missing packets by utilizing the packets before and after the missing packets and, if necessary, by adding frames of silence. Frames of silence are frames with silence sounds in them.

Since the network routes each packet separately, the packets do not, necessarily, arrive in order or at a regular rate. At the beginning of a speechbursts, this "jitter" in the arrival rate can be extremely problematic. Therefore, the fullness setting unit 51 determines a desired fullness level to overcome most of the jitter and provides the playback buffer 15 with a block of silence data to fill the playback buffer 15 to the desired fullness level. The fullness unit 51 indicates to the adjuster 52 what the fullness level is, after which, the switch means 54 switch control to the fullness adjuster 52.

While the audio device 14 is playing the silence block, the fullness adjuster 52 handles the incoming audio data and provides them to the playback buffer 15. The fullness adjuster 52 adds or removes audio data in order to match the playback rate of the audio device 14 with the rate at which the converted audio data is present. In other words, the packet handler 50 generally converts, or scales, the audio datastream to the converting rate of the audio device 14 of the destination workstation and the fullness adjuster 52 performs fine adjustments to the data rate of the incoming datastream to more accurately match the converting rate of the audio device 14. To do so, the fullness adjuster 52 adjusts the desired fullness level.

If the audio device 14 plays all the data in its buffer 15, either before or when the speechbursts ends, typically due to increased jitter on the network, the switch means 54 switches control to the fullness setting unit 51 which slightly increases the fullness level to compensate for the increased jitter and provides another silence block of the size of the increased fullness level.

Fullness adjuster 52 processes the audio data to ensure that the playback buffer 15 is as full as necessary but not overly full, since the more data stored in the playback buffer 15, the longer it takes before the operator hears the received data. Fullness adjuster 52 adjusts the rate of the audio data so as to generally match the playback rate of the audio device 14. Thus, if the playback rate is faster than that of the converted audio data, fullness adjuster 52 adds extra samples to the audio data every so many samples. Conversely, if the playback rate is slower than the rate of converted data, fullness adjuster 52 drops every so many audio samples.

It will be appreciated that the packet handler 50 and the fullness adjuster 52 not only compensate for mismatches between the playback rate and the rate at which the network transfers packets, but also compensate for differences between the packet creation rate of the source audio device 14a and that of the playback rate of the destination audio device 14b. Thus, the audio transceiver of the present invention enables communication between Pcs having audio devices by different manufacturers, which typically do not have similar sampling and playback rates. Similarly, the present invention enables a single audio device manufacturer to produce audio devices whose sampling rates range within a large tolerance range.

It will further be appreciated that the fullness setting unit 51 and the fullness adjuster 52 operate to maintain the playback buffer 15 full, without any knowledge of when the incoming audio data were originally produced.

Figure 5:
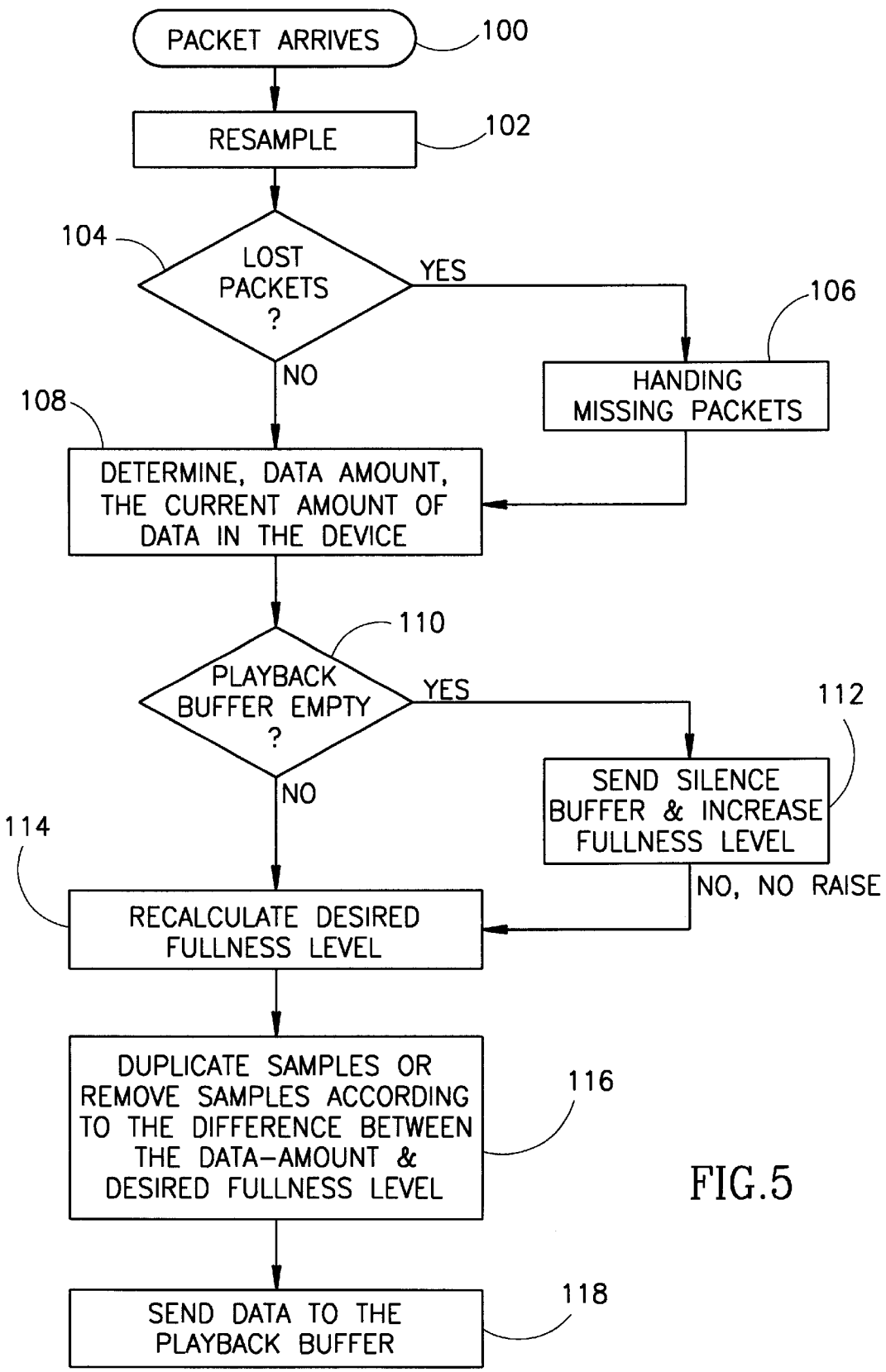
FIG. 5 is a flow chart illustration of the method performed by the receiver of FIG. 4.

Reference is now made to FIG. 5 which illustrates the operation of the receiver 37, for each incoming packet, in flow chart format.

When a packet arrives (step 100), its datastream is first resampled (step 102) to match the converting frequency of the destination audio device 14. The resampling procedure can be any resampling procedure which performs anti-alias filtering, interpolation and decimation. The method utilized by the CAT audio device, commercially available from the common assignees of the present invention, is suitable and is operative on PCs. Other methods of resampling are also known.

Afterwards, the sequence number of the new packet is compared to that of the previously received packet. If there is a gap between the two sequence numbers (step 104), the gap is filled (step 106). One method for filling the gap is as follows: The frames bordering each side of the gap are duplicated and the remaining frames of the missing packet or packets are filled with silence. Thus, if the two received packets have frames P1, P2, P3 and P4, P5, P6 in order, and one packet is missing, the resultant series will be: P1, P2, P3, P3, silence, P4, P4, P5, P6. Other methods of filling the gap are also possible.

Steps 100–106 form the operations of packet handler 50.

Whether or not a packet was missing, in step 108, the receiver 37 determines the current amount of data DATA_AMOUNT stored in the playback buffer. The current amount of data DATA_AMOUNT indicates the delay between the arrival of an audio sample and the time it is played out by the audio device 15 and is defined as the difference between the amount of data sent for use by the playback buffer 15 and the amount of data which the playback buffer 15 utilized. In equation format:

$$\text{DATA\_AMOUNT} = \text{AMOUNT\_SENT} - \text{AMOUNT\_RETURNED} \qquad (1)$$

Typically, the amount sent and amount returned are continually calculated over the course of a speechbursts. DATA_AMOUNT is calculated over a moving window of time (of typically 2 seconds) and thus, is an average, rather than an instantaneous value.

In step 110, the receiver 37 determines if the current amount of data DATA_AMOUNT is 0 (i.e. the playback buffer 15 is empty). If it is more than 0, step 114 is performed. Otherwise, step 112 is performed.

If, despite the operation of the fullness adjuster 52, the playback buffer 15 was emptied, this indicates that the network jitter has gotten worse or that the speechbursts has ended. To compensate for the possible increased jitter, the fullness setting unit 51 increases the fullness level by a predefined amount, such as by 10%. At the same time, the fullness setting unit 51, in step 112, sends a silence block of at least the size of the current desired fullness level.

If, alternatively, the playback buffer was not empty, the fullness adjuster 52 is operative. In step 114, it determines whether or not the current desired fullness level is too large and in step 116, it adjusts the data to be sent to the playback buffer 15 in order to achieve the desired fullness level.

The current desired fullness level is increased (in step 112), whenever the playback buffer 15 approaches empty and is decreased (in step 114) whenever there were no gaps during the last predetermined length of time, such as for 10 seconds. If the minimum current amount of data DATA_AMOUNT for the last, say 10 seconds, is larger than the minimum allowed for the specific audio device 14, then the desired fullness level is set to the mean value between the minimum allowed amount of data (for the specific audio device 14) and the minimum DATA_AMOUNT for the last, say, 10 seconds.

It will be appreciated that any other function to reduce the desired fullness level which reduces the level without causing a gap to occur, is also suitable.

In step 116, the difference between the current amount of data DATA_AMOUNT and the desired fullness level is determined. The difference can be measured in seconds of data or in numbers of blocks of data. The data to be sent to the playback buffer 15 is then processed to force the difference to be as close to zero as possible.

The processing involves adding or removing audio samples as a function of how large the difference is. A positive difference (i.e. the current amount of data is larger than the desired fullness level), indicates that the input rate is higher than the playback rate. Therefore, some of the audio samples should be removed. A negative difference requires the addition of audio samples.

For each type of audio device, the receiver 37 has a LookUp Table (LUT) defining the function for adding and removing. The following table is useful for the Soundblaster audio devices:

| Difference (in msec) | Duplication amount |
|---|---|
| 500 | −1 per 20 = −5% |
| 300 | −1 per 50 = −2% |
| 150 | −1 per 100 = −1% |
| −150 | +1 per 100 = +1% |
| −300 | +1 per 50 = +2% |
| −500 | +1 per 20 = +5% | where +1 and −1 indicate addition and removal of a frame and "per X" indicates for every X frames.

When there are frames which have been artificially added due to a missing packet (in step 106), then the artificially added frame is selected as the one to be removed. When a frame is to be added, the frame which is added is a copy of the frame which will be next to it.

Although not shown in FIG. 5, the particular duplication amount is maintained until the difference is close to zero. At that point, the duplication amount can be changed.

Furthermore, when duplication or removal is occurring, the window size for determining the current amount of data is reduced, for example to 500 msec.

Once the processing has finished, the data of the packet are sent (step 118) to the playback buffer 15 and the process repeated for the next packet.

The following pseudo code details the operation of the duplication/removal mechanism of step 116:

PseudoCode for Step 116:

```
PDup - Previous Duplication_Amount
Duplication_Amount
    (Duplication_Amount<0, means deletion).
    (Duplication_Amount>0, means duplication).
Data_Amount-(averaged over 2 sec.)
Short_Data_Amount-(averaged over 500 ms.)
Fullness_Level
Difference_in_Amount
Init:
Duplication_Amount = 0;
PDup = 0;
```

When packet arrives:

```
(Reevaluate Duplication_Amount)
Difference_in_Amount = Data_Amount − Fullness_Level
Short_Difference_in_Amount = Short_Difference_in
_Amount − Fullness_Level
Duplication_Amount = find (Difference_in_Amount) in table.
(Stop Dup./Del Process)
if (PDup!= 0) {
    if (PDup < 0 && Short_Difference_in_Amount < 0)
    PDup = 0; (Stop Deletion)
    if (PDup > 0 && Short_Difference_in_Amount > 0)
    PDup = 0; (Stop Duplication)
    if (|Duplication_Amount| > |Pdup|)
    PDup = Duplication_Amount;
    if difference increases then increase
    Dup./Del.accordingly)
}
if (PDup == 0
```

```
Duplication_Amount = find(Difference_in_Amount) in table.
PDup = Duplication_Amount
}
```

It will be appreciated by persons skilled in the art that the present invention is not limited to what has been particularly shown and described hereinabove. Rather the scope of the present invention is defined by the claims which follow:

We claim:

1. An audio transceiver between an audio device of a personal computer and a packet data network, the audio transceiver comprising:

means for receiving a stream of sequence stamped audio packets from said packet data network;

fullness setting means for transferring at least a silence frame to a playback buffer of said audio device whenever said playback buffer is empty in order to fill said playback buffer to an adjustable fullness level; and fullness adjusting means for controlling the fullness level of the playback buffer, said fullness adjusting means operating to duplicate or remove at least one frame until a difference between a current fullness level and the desired fullness level is substantially zero.

2. A transceiver according to claim 1 and also comprising means for sequence- and destination-stamping all of said audio packets; and means for transmitting said audio packets via said network.

3. A transceiver according to claim 1 and also comprising voice detection means which stores at least a portion of said received audio packets and sends after said sound threshold level is reached said stored audio packets with audio packets received after said sound threshold level is reached.

4. A transceiver according to claim 1 and wherein said packet data network is a private network.

5. A transceiver according to claim 1 and wherein said packet data network is a public network.

6. A transceiver according to claim 1 and wherein said fullness setting means comprises means for increasing said adjustable fullness level and wherein said fullness adjusting means includes means for decreasing said adjustable fullness level and means for processing audio data within said audio packets in order to fill said playback buffer to the current value of said adjustable fullness level.

7. A transceiver according to claim 6 and wherein said means for processing comprises means for determining the amount of data in said playback buffer during a predetermined window of time.

8. A transceiver according to claim 7 and wherein said means for processing includes means for adding and removing portions of said audio data as a function of whether or not the current amount of data is less or more than said current value of said adjustable fullness level.

9. A transceiver according to claim 8 and wherein said means for adding and removing comprise means for maintaining the size of said portions of audio data until said current amount of data reaches said current value of said adjustable fullness level.

10. A method for transmitting and receiving audio data between an audio device of a personal computer and a packet data network, the method comprising the steps of:

receiving a stream of sequence-stamped audio packets from said packet data network;

transferring at least a silence frame to a playback buffer of said audio device whenever said playback buffer is empty in order to fill said playback buffer to an adjustable fullness level; and controlling the fullness level of the playback buffer, said controlling comprising duplicating or removing at least one frame until a difference between a current fullness level and the desired fullness level is substantially zero.

11. A method according to claim 10 and also comprising the steps of:

sequence- and destination-stamping all of said audio packets; and transmitting said audio packets via said network.

12. A method according to claim 10 and also comprising the steps of storing at least a portion of audio packets received before a sound threshold level is reached and sending after said sound threshold level is reached said stored audio packets with audio packets received after said sound threshold level is reached.

13. A method according to claim 10 and wherein said packet data network is a private network.

14. A method according to claim 10 and wherein said packet data network is a public network.

15. A method according to claim 10 and wherein said step of transferring includes the step of increasing said adjustable fullness level and wherein the step of adaptively controlling includes the steps of decreasing said adjustable fullness level and processing audio data within said audio packets in order to fill said playback buffer to the current value of said adjustable fullness level.

16. A method according to claim 15 and wherein said step of processing includes the step of determining the amount of data in said playback buffer during a predetermined window of time.

17. A method according to claim 16 and wherein said step of processing includes the step of adding and removing portions of said audio data as a function of whether or not the current amount of data is less or more than said current value of said adjustable fullness level.

18. A method according to claim 17 and wherein said step of adding and removing includes the step of maintaining the size of said portions of audio data until said current amount of data reaches said current value of said adjustable fullness level.

19. A transceiver according to claim 1 wherein said means for receiving further comprising means for duplicating at least one frame of two packets bordering a gap, said gap detected whenever the sequence number of said two adjacent packets is not consecutive.

20. A transceiver according to claim 19 wherein said means for receiving further comprises inserting at least one silence frame between said duplicated frames.

21. A transceiver according to claim 19 wherein said fullness adjusting means remove at least one frame of the frames duplicated by said means for receiving due to said gap.

22. A transceiver according to claim 19 wherein said fullness adjusting means duplicate at least one frame of the frames not duplicated by said means for receiving due to said gap.

23. A transceiver according to claim 1 wherein said adjustable fullness level is determined in accordance with the variations in size of said playback buffer.

24. A method according to claim 10 wherein said step of receiving further comprising duplicating at least one frame of two packets bordering a gap, said gap detected whenever the sequence number of said two adjacent packets is not consecutive.

25. A method according to claim 24 wherein said step of receiving further comprises inserting at least one silence frame between said duplicated frames.

26. A method according to claim 24 wherein said controlling comprises removing at least one frame of the frames duplicated in said step of receiving due to said gap.

27. A method according to claim 24 wherein said controlling comprises duplicating at least one frame of the frames not duplicated by said means for receiving due to said gap.

28. A method according to claim 10 wherein said controlled fullness level is determined in accordance with the variations in size of said playback buffer.

29. An audio transceiver between an audio device of a personal computer and a packet data network, the audio transceiver comprising:

means for receiving a stream of sequence stamped audio packets from said packet data network;

means for duplicating at least one frame of two received packets bordering a gap, said gap detected whenever the sequence number of said two adjacent received packets is not consecutive; and means for inserting at least one silence frame between said duplicated frames.

30. A method for transmitting data between an audio device of a personal computer and a packet data network, comprising:

receiving a stream of sequence stamped audio packets from said packet data network;

duplicating frames of two received packets bordering a gap, said gap detected whenever the sequence number of said two adjacent received packets is not consecutive; and inserting at least one silence frame between said duplicated frames.

* * * * *